J. H. TAUSSIG.
AUTOMATIC WATER GAS SET.
APPLICATION FILED APR. 25, 1914.

1,119,472.

Patented Dec. 1, 1914.
4 SHEETS—SHEET 1.

WITNESSES:
Rob R Kitchel
Frank E French

INVENTOR
John Hawley Taussig
BY
Augustus B. Stoughton,
ATTORNEY.

J. H. TAUSSIG.
AUTOMATIC WATER GAS SET.
APPLICATION FILED APR. 25, 1914.

1,119,472.

Patented Dec. 1, 1914.
4 SHEETS—SHEET 4.

WITNESSES:

INVENTOR
John Hawley Taussig
BY
Augustus B. Stoughton
ATTORNEY.

UNITED STATES PATENT OFFICE.

JOHN HAWLEY TAUSSIG, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

AUTOMATIC WATER-GAS SET.

1,119,472.  Specification of Letters Patent.  Patented Dec. 1, 1914.

Application filed April 25, 1914. Serial No. 834,311.

*To all whom it may concern:*

Be it known that I, JOHN HAWLEY TAUSSIG, a citizen of the United States, residing at the city of Philadelphia, in the county of Philadelphia and State of Pennsylvania, have invented a new and useful Automatic Water-Gas Set, of which the following is a specification.

The principal objects are to provide a water gas set which shall be automatic, reliable, safe and efficient in operation; to provide for changing the period of time occupied by the blows and runs as well as the relative duration of each of them; to guard against accidents by providing for the automatic positioning of the parts of the apparatus in safe positions in case of failure of the automatic operating or controlling mechanism; to provide reliable and efficient mechanism responsive to small movements and adapted to produce large, quick or rapid movements; and to provide for controlling fluid ways of large capacity by short movements of a small valve.

The invention will be claimed at the end hereof but will be first described in connection with the embodiment of it chosen for illustration in the accompanying drawings in which—

Figure 1:
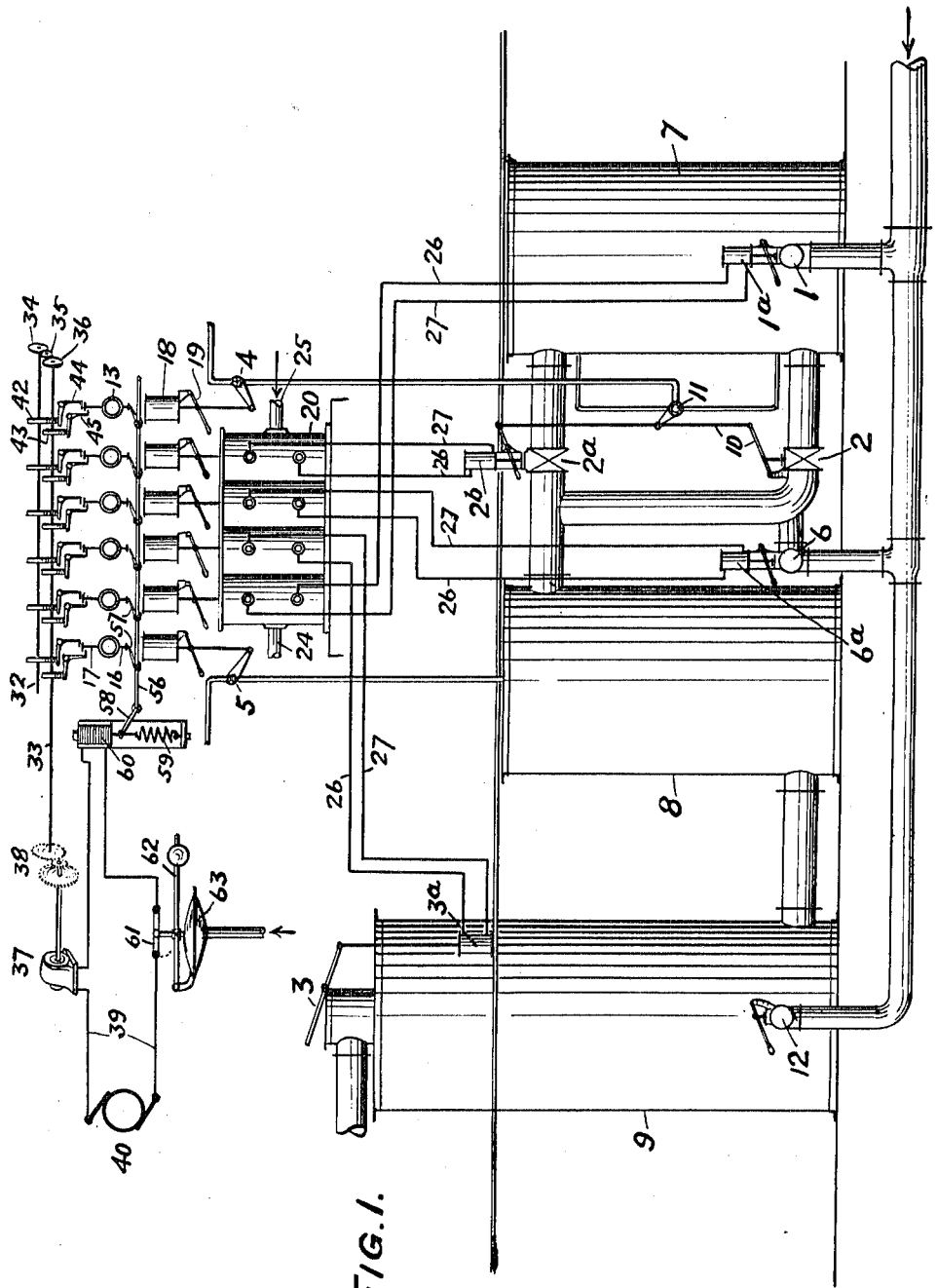
Figure 2:
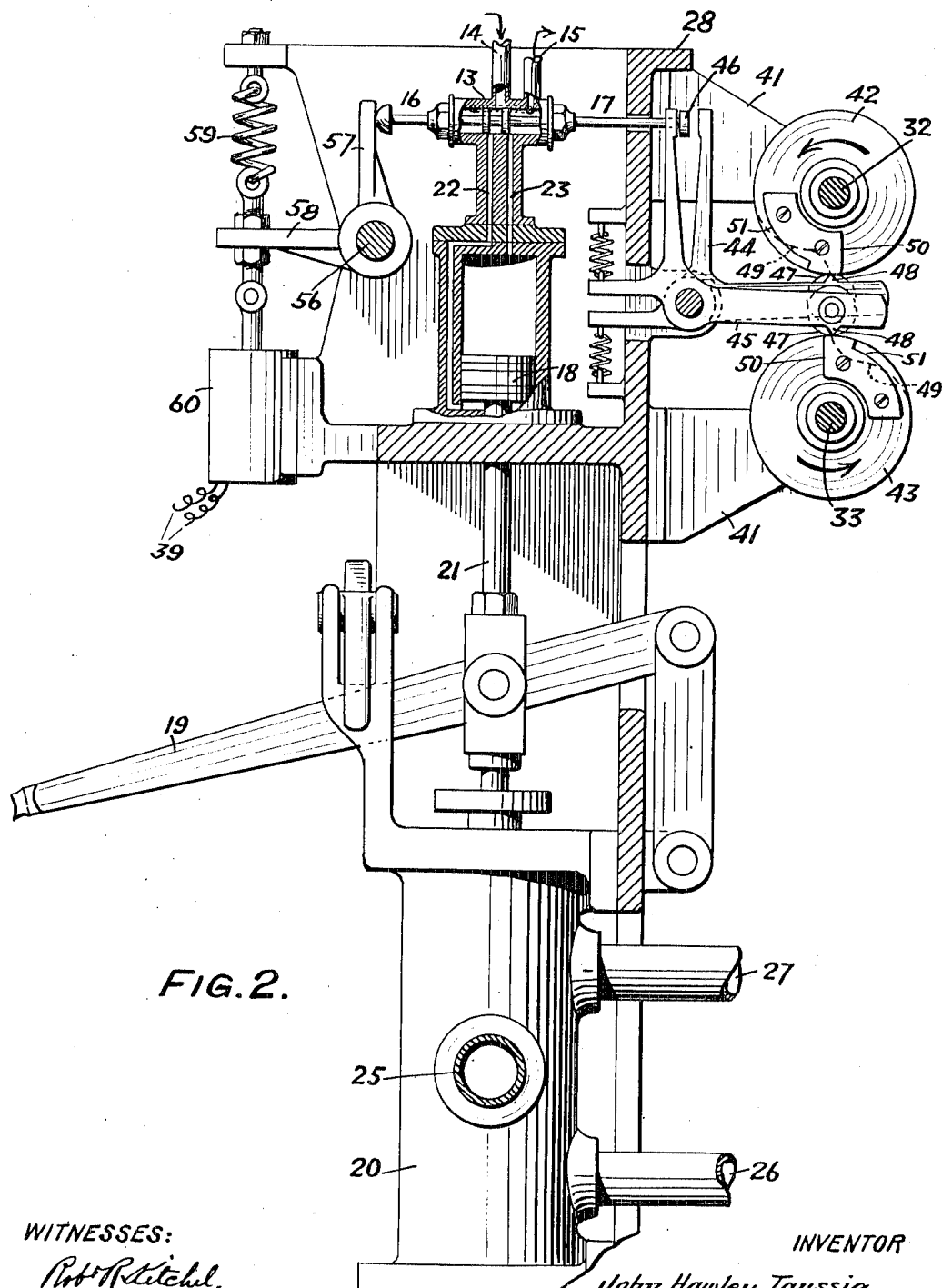
Figure 3:
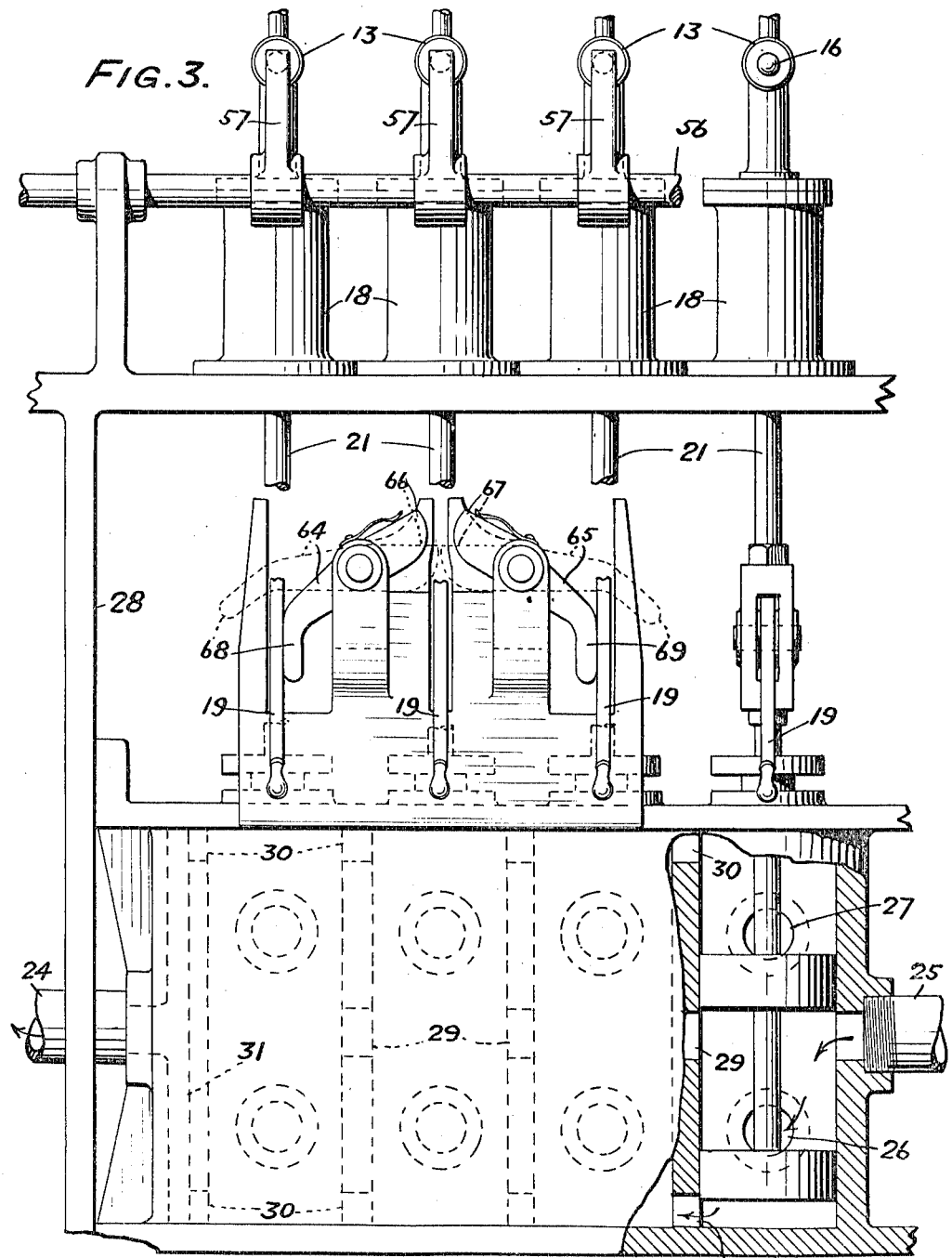
Figure 4:
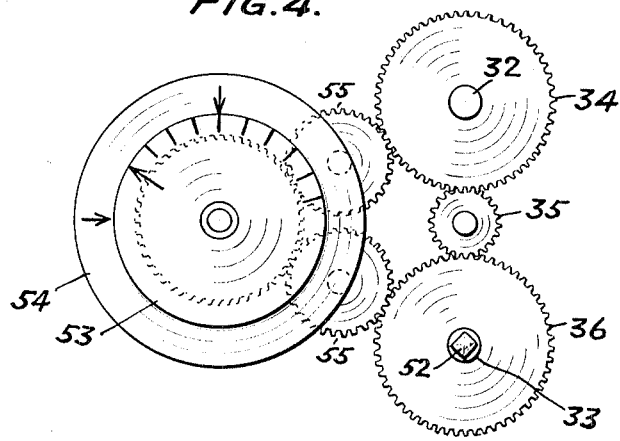
Figure 5:
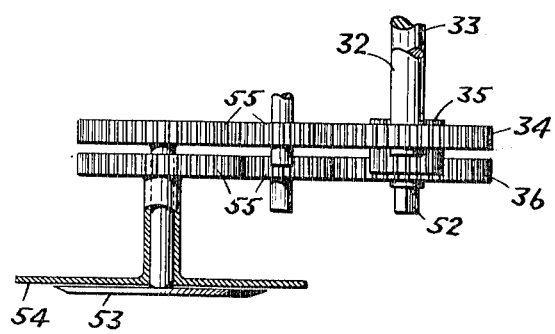
Figure 6:
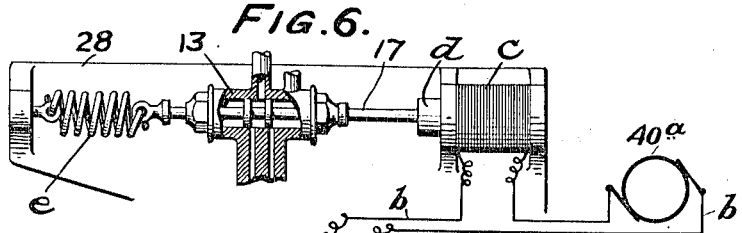

Figure 1, is a diagrammatic view of an automatic water gas set embodying features of the invention. Fig. 2, is a view principally in cross section illustrating portions of the automatic controlling apparatus. Fig. 3, is a front view partly in section of the same. Fig. 4, is an end view of a portion of the controlling apparatus. Fig. 5, is a top view partly in section of the same, and, Fig. 6, is a sectional view illustrating a modification.

In the drawings 1, 2, $2^a$, 3, 4, 5 and 6, are the apparatus valves. The valves 1 and 6, are the air blast valves for the generator 7, and the carbureter 8. The valves 2 and $2^a$, are the so-called hot valves and they are used when the direction of the run is changed in the generator 7. 3, is the stack valve shown as arranged on the superheater 9. 5, is the oil valve, and 4, is the steam valve.

$3^a$, $1^a$ and $6^a$, are double acting pistons and cylinders for operating the correspondingly lettered apparatus valves.

The double acting piston and cylinder $2^b$, is connected with a system of levers 10, by which the valves $2^a$ and 2, and the two-way steam valve 11 are operated to produce either up or down runs.

Inasmuch as the air blast valve 12, is comparatively seldom used, it is shown as manually operated, but it will appear from the following description that, if desired, it can be operated like the other apparatus valves.

13, are pilot valves of which there is one for every apparatus valve that is to be automatically operated. These valves are all alike and the description may well be confined to one of them.

14 and 15, are the inlet and outlet fluid connections for the valve 13. The stem of the valve 13, projects from the casing at each end as shown at 16 and 17, and the valve is of the slide variety. Each pilot valve 13, is provided with a double acting pilot piston and cylinder 18, there being one such piston and cylinder 18, for each apparatus valve that is to be automatically operated. The piston of each of these elements 18, is provided with a hand lever 19, so that the apparatus can be operated by hand, if desired. Inasmuch as the pistons and cylinders 18, have sufficient stroke and power for operating the steam and oil valves 4 and 5, they are connected with the operating levers of those valves. In the case of the other apparatus valves which have to be moved for a considerable distance in a short time, use is made of main valves 20, which are alike and of which there is one for each of the last mentioned apparatus valves. The stems 21, of these main valves are connected with the pistons of the elements 18. The pilot valves 13, in combination with the main valves 20, and the pistons and cylinders 18, coöperate in such a way that a very slight movement of the pilot valve opens up comparatively large fluid ways in the valve 20, and thus the apparatus valves are moved quickly through a comparatively long distance although they are relatively large and heavy, while the pilot valve is light and small.

22 and 23, are the induction and eduction ports for the piston and cylinder 18.

24 and 25, are the eduction and induction connections for the main valve 20, and 26 and 27, are the connections from the main valve to the apparatus valve pistons and cylinders. The main valves 20, are shown as included within a single housing, Fig. 3, which is connected with or carried by a frame 28, that supports the pilot pistons and cylinders 18, and also certain other parts as will be described. The inlet 25, is common to all the valves 20, as is also the outlet 24. The casings of the valves 20, are connected as at 29 and 30, by means of suitable openings. The openings 29, are inlet openings and the openings 30, are exhaust openings. The latter at the left hand end are connected by a port 31, which communicates with the outlet 24.

32 and 33, are a pair of interconnected rotating cam sheets having cams or tappet arms. These shafts are geared together as by the toothed wheels 34, 35 and 36, Fig. 4, and they run in the same direction. One of these shafts is driven by a power device such as the motor 37, Fig. 1, through suitable gearing as 38.

39, is the motor circuit supplied in any appropriate way as by the generator 40.

The motor 37, is one which can be run at different speeds. The shafts 32 and 33, are shown as mounted in brackets 41, on the frame 28. These shafts 32 and 33, are each provided with cams, projections or tappet devices 42 and 43, of which there is a pair for each pilot valve. Each cam of a pair operates upon one of a pair of spring retracted followers or tappet arms 44 and 45, which respectively operate upon opposite faces of a head 46, on the pilot valve spindle. At their other ends these arms are each provided with a roller 47, and a knife edge 48. The roller ordinarily runs on the rim of its cam and thus holds the knife edge clear of the cam but when the tappet arm is about to drop into the low part of the cam, the roller first runs into a groove 49, in the cam thus permitting the knife edge to ride on a wear plate 50, and to then drop into a low part 51. By this arrangement the knife edge is protected from unnecessary wear and the tappet arm is afforded a quick movement. It will of course be understood that the cams on one shaft shift the pilot valves in one direction and that the cams on the other shaft shift the pilot valves in the other direction and that at the end of the shift the pilot valves have been properly positioned and left free. The angular relation of the shafts and their cams can be changed by disengaging the wheel 35, and turning the shaft 33, as by means of a crank applied to its square end 52, Figs. 4, and 5, whereupon the gear wheel 35, can be again put into mesh.

53 and 54, are concentric dials driven respectively by equivalent trains of wheels 55, from the respective shafts 32 and 33, so that the dials 53 and 54, indicate the relative angular position of the shafts.

56, is a shaft revolubly supported in standards held by the frame 28, and it is provided with tappet arms or projections 57, one for each pilot valve, so that when the shaft 56, is turned from its normal position in Fig. 2, its arms 57, push all of the pilot valves into the same position, which position corresponds with a safe position for all of the apparatus valves. On this shaft 56, there is an arm 58, subjected to the pull of a spring 59, and to the pull of an electromagnet 60.

When there is power in the circuit 39, the spring and electromagnet balance each other and the parts are in the position shown in Fig. 2, but upon failure of motive power in the circuit 39, the spring preponderates and turns the arm 58, into position for bringing the arms 57, into action on the pilot valves. Connected with the fluid pressure system by which the various apparatus valves and described parts appertaining thereto are operated, is a circuit breaker 61, in the motor circuit 39, so that if the motive power in the fluid system fails, the circuit is interrupted and the safety mechanism controlled by the electromagnet 60, comes into operation in the manner described. As shown the circuit breaker 61, is connected with a weighted arm 62, that is held up by a diaphragm 63, exposed to the fluid pressure. As a further precaution against accidents, there are a pair of centrally pivoted dogs 64 and 65, Fig. 3, which are normally positioned as by springs and as shown in dotted lines in Fig. 2, in such a way that their inner ends 66 and 67, block the line of travel of one of the handles 19, so that normally that handle cannot be moved and the handle so blocked appertains to the stack valve and when blocked the stack valve cannot be closed. The handles 19, adjacent to this stack valve handle, when pulled down, operate on the tails of the dogs 68 and 69, and so turn the dogs into the position shown in full lines in Fig. 3, in which their inner ends 66 and 67, do not block the handle 19, that relates to the stack valve. The handles 19, which operate on the tails 68 and 69, relate to air blast valves of the generator and superheater. It is therefore evident that the stack valve handle 19, cannot be pulled down to close the stack valve until the generator and carbureter air blast handles have been pulled down to shut off the air blast. It will be understood that it is undesirable to have the stack valve closed when the air blast is on, or otherwise stated, it is undesirable to have the air blast on when the stack valve is closed as during the run, as this might and probably would result in a more or less violent explosion. When the handles 19, are in one position, say up, all of the apparatus air valves and also the stack valve are open and the stack valve cannot be closed, and when the handles that relate to the air valves are down, the air blast is shut off from the apparatus and the stack valve handle can be moved freely.

The mode of operation of the apparatus may be described as follows: The speed of rotation of the shafts 32 and 33, is adjusted in such a way that each of them makes one complete revolution in the period of time required for the completion of a blow and run; for example, if the blow is four minutes and the run is four minutes, then the shafts revolve once in eight minutes. The cams on one of the shafts 43 or 42, are so set in respect to each other that they cause the described mechanism which they control to shift the apparatus valves in proper order and into proper positions for ending a run and starting a blow. The cams on the other shaft are so set in respect to each other that they cause the described mechanism which they control to shift the apparatus valves in proper order and into proper positions for ending a blow and starting a run. Thus the alternation of runs and blows is effected automatically and will continue as long as the shafts continue to revolve. However, if the motive power either for the shafts or for the valve gear should fail, the safety mechanism 56, 57, 59, will come into action, and notwithstanding the positions of the pilot valves 13, will arrange them into such positions that all of the apparatus valves are closed with the exception of the stack valve which is open and this position of the apparatus valves is safe. Thereupon the apparatus can be operated manually until the automatic mechanism is again effective, and whether the apparatus be operated automatically or manually the interlocking mechanism 64 and 65, prevents the introduction of air when the stack valve is closed or insures that the stack valve shall be open when air is introduced. It has been said that the speed of the shafts 32, is such that they each make one revolution during the time occupied by a blow and run. To apportion this time between the blow and run use is made of the mechanism shown in Fig. 4, and hereinabove described. Electricity may be used for the motive power or fluid instead of water.

Referring to Fig. 6, the tappet arms 44 and 45 operate the circuit controller or make-and-break device $a$, which opens and closes a circuit $b$, that includes a solenoid $c$, and also a source of energy which is diagrammatically shown as $40^a$. The core $d$, of the solenoid constitutes a power device for operating valves or switches and it is shown as connected with the end 17 of the stem of the valve 13. The other end of this stem is connected with a spring $e$, so that if the current in the circuit fails the valve is set in appropriate and safe position by the spring $e$.

It will be obvious to those skilled in the art that modifications may be made in details of construction and arrangement without departing from the spirit of the invention which latter is not limited otherwise than as the prior state of the art and the appended claims may require.

What I claim is:

1. An automatic water gas set comprising the combination of a gas generating apparatus and its apparatus valves, a system of pilot and main valves and accessories including apparatus pistons and cylinders for operating the apparatus valves, rotating mechanism for positioning the pilot valves to operate the set and for thereupon freeing the pilot valves, and mechanism responsive to motive power and adapted upon failure thereof to set the pilot valves for putting the apparatus valves in safe positions.

2. An automatic water gas set comprising the combination of a gas generating apparatus and its apparatus valves, a system of pilot and main valves and accessories including pistons and cylinders for operating the apparatus valves, rotating elements and tappet mechanism for positioning the pilot valves to operate the set and perform blows and runs, and mechanism for changing the angular relation of the rotating elements to relatively change the duration of the runs and blows.

3. An automatic water gas set comprising the combination of a gas generating apparatus and its apparatus valves, a system of pilot and main valves and accessories including apparatus pistons and cylinders for operating the apparatus valves, and rotating mechanism for positioning the pilot valves to operate the set, substantially as described.

4. An automatic water gas set comprising the combination of a gas generating apparatus and its apparatus valves, pilot valves, pilot pistons and cylinders, main valves responsive to some of the pilot pistons and cylinders, pistons and cylinders responsive to the main valves and adapted to operate some of the apparatus valves, and mechanism connections between some of the pilot pistons and cylinders and some of the apparatus valves.

5. An automatic water gas set comprising the combination of a gas generating apparatus and its apparatus valves, pilot pistons and cylinders having pilot valves, main valves responsive to the pilot pistons and cylinders apparatus pistons and cylinders controlled by the main valves for operating the apparatus valves, and a rotating element for operating the pilot valves, substantially as described.

6. In an automatic water gas set the combination of apparatus valves, power devices for operating said valves, controls for the power devices, a pair of rotating elements for normally operating the controls and then freeing the same, and means responsive to failure of motive power for operating the controls, substantially as described.

7. In an automatic water gas set the combination of apparatus valves, fluid actuated power devices for operating the apparatus valves, pilot controls for the power devices, tappet shafts for the pilot controls, a motor and circuit for operating the shafts, safety mechanism tending to operate the controls, an electromagnet device in the circuit for retaining the safety mechanism, and means responsive to failure of fluid motive power for interrupting said circuit, substantially as described.

8. In an automatic water gas set the combination of blast and stack valves, power devices for operating the same, handles for said valves, and pivotal dogs adapted to block the stack valve handle and to be actuated by the air blast handles to release the same, substantially as described.

9. An automatic water gas set comprising the combination of pilot valves and their pilot pistons and cylinders, main valves operated by said pilot pistons and cylinders, apparatus valves and their pistons and cylinders operated by the main valves, a pair of inter-connected rotating cam shafts, followers operated by the cam shafts and adapted to position the pilot valves to operate the set, safety mechanism responsive to failure of motive power and adapted to position the pilot valves to make the set safe, means for changing the angular relations of the cam shafts to adjust runs and blows, and interlocking mechanism for positively preventing closure of the apparatus stack valve when the apparatus blast valves are open, substantially as described.

10. The combination of a water gas set and its apparatus valves, power devices for operating the valves, cam shafts for selectively operating the power devices to move the valves in groups appropriate for causing the alternate occurrence of runs and blows, and means for varying the relative durations of the runs and blows, substantially as described.

11. The combination of a water gas set and its apparatus valves of which some have greater weight and movement than others, power devices of which some are adapted to operate some of said valves and of which others are adapted to operate others of said valves, and duplicate pilot controls for all the power devices, substantially as described.

12. The combination of a water gas set and its apparatus valves, power devices for operating the valves, rotating elements having provisions whereof those on one element operate the power devices to set the valves for a blow and whereof those on the other element operate the power devices to set the valves for a run, and means for changing the angular relation of the rotating elements with their provisions fast upon them to vary the relative duration of runs and blows.

13. The combination of a water gas set and its apparatus valves, power devices for operating the valves, controlling devices for the power devices whereof some operate the controlling devices to cause the power devices to set the valves for a run and others operate the controlling devices to cause the power devices to set the valves for a blow, means for changing the relative positions of the controlling devices, and an indicator for showing the relative positions of the controlling devices.

In testimony whereof I have hereunto signed my name in the presence of witnesses.

JOHN HAWLEY TAUSSIG.

Witnesses:
CLIFFORD K. CASSEL,
FRANK E. FRENCH.